United States Patent [19]
Bellego et al.

[11] Patent Number: 4,765,572
[45] Date of Patent: Aug. 23, 1988

[54] SYSTEM FOR CONTROLLING A MOBILE AERODYNAMIC SURFACE OF AN AIRCRAFT

[75] Inventors: Roger Bellego, Blagnac; Etienne Foch, Toulouse, both of France

[73] Assignee: Aerospatiale Societe Nationale Industrielle, Paris, France

[21] Appl. No.: 61,145

[22] Filed: Jun. 12, 1987

[30] Foreign Application Priority Data

Jun. 16, 1986 [FR] France .................... 86 08652

[51] Int. Cl.⁴ .............................................. B64C 9/10
[52] U.S. Cl. ...................................... 244/178; 244/82; 244/75 R
[58] Field of Search .............. 244/82, 178, 224, 75 R, 244/76 R, 221

[56] References Cited

U.S. PATENT DOCUMENTS

| | | | |
|---|---|---|---|
| 2,395,671 | 2/1946 | Kleinhans et al. | 244/224 |
| 2,843,344 | 7/1958 | Gibb | 244/82 |
| 3,378,217 | 4/1968 | Diani | 244/82 |

*Primary Examiner*—Galen Barefoot
*Assistant Examiner*—Rodney Corl
*Attorney, Agent, or Firm*—Fisher, Christen & Sabol

[57] ABSTRACT

This invention relates to a system for controlling an aerodynamic surface mounted mobile on an aircraft so as to be able to pivot freely about a fixed axis and provided with a tab itself articulated on the trailing edge of the aerodynamic surface, the system being such that elastic connecting devices are provided between the tab and the aerodynamic surface and the tab can be directly actuated by the pilot, via a voluntary actuating member and a mechanical linkage. According to the invention, this system comprises: an actuator interposed between the elastic connecting device and the aerodynamic surface; a device for controlling the actuator; and a clutch connecting the structure of the aircraft to the mechanical linkage; and the device for controlling the actuator also controls the clutch, so that the latter is in disengaged position when the actuator is active and in engaged position when the actuator is inactive.

10 Claims, 3 Drawing Sheets

SYSTEM FOR CONTROLLING A MOBILE AERODYNAMIC SURFACE OF AN AIRCRAFT

The present invention relates to a system for controlling a mobile aerodynamic surface of an aircraft.

A so-called "tab" is known to be provided on certain aerodynamic surfaces of an aircraft, such as for example the rudder, elevators, ailerons, etc..., articularly in the case of an aeroplane without assisted control. This tab is intended to reduce the manoeuvring efforts that the pilot must exert on such an aerodynamic surface in order to deflect it and it is articulated on the trailing edge thereof.

In certain known so-called "spring-tab" control systems, said mobile aerodynamic surface to be controlled is freely articulated about its deflection axis, whilst an elastic connection is provided between said tab and said aerodynamic surface and said tab is directly actuated by the pilot, via a voluntary actuating member (control stick, rudder bar) and a mechanical linkage. In this way, deflection of the rudder is obtained by control of the tab and transmission by said elastic connection. It will be noted that, thanks to the action of the elastic connection, the aerodynamic assistance which the tab gives the pilot is all the greater as the effort of controlling said tab is greater.

Furthermore, it is currently known to trim a deflected aerodynamic surface in order to maintain the aeroplane on its path and to allow the pilot to relax his effort of control.

In certain control systems of the "trim tab" type, such as the one described in U.S. Pat. No. 2,843,344, it is already known to provide such a function of trim. However, in that case, said systems are not of the "spring tab" type described hereinabove, but of the type in which the voluntary actuating member and the mechanical linkage act directly on the rudder (and not on the tab as in the case of a "spring tab") and in which a mechanical coupling exists between said tab and said mobile aerodynamic surface. In fact, the elastic connection provided in said "spring-tab" systems introduces an additional parameter of freedom with respect to the mechanical coupling systems, with the result that this elastic connection is the origin of aerodynamic vibrations unsuitable for performing a trim function.

Consequently, up to the present time, when it was desired to have both the "spring tab" and "trim tab" functions on an aircraft, it was necessary to apply the "spring tab" function on certain mobile aerodynamic surfaces and the "trim tab" function on other aerodynamic surfaces provided with tabs respectively connected mechanically thereto. This heretofore applied solution is thus complicated and expensive, all the more so as it is often necessary to provide an additional system of artificial stabilization.

It is an object of the present invention to overcome this drawback and to allow trim of an aerodynamic surface provided with a tab, to which it is connected by an elastic connection.

To this end, according to the invention, the system for controlling an aerodynamic surface mounted mobile on an aircraft so as to be able to pivot freely about a fixed axis and provided with a tab itself articulated on the trailing edge of said aerodynamic surface, said system being such that elastic connecting means are provided between said tab and said aerodynamic surface and said tab can be directly actuated by the pilot, via a voluntary actuating member and a mechanical linkage, is noteworthy:

in that it comprises:
an actuator interposed between said elastic connecting means and said aerodynamic surface;
a device for controlling said actuator; and
a clutch connecting the structure of the aircraft to said mechanical linkage;

and in that said device for controlling the actuator also controls said clutch, so that the latter is in disengaged position when said actuator is active and in engaged position when said actuator is inactive.

Thus, when the pilot wishes to deflect said aerodynamic surface, he acts on said voluntary actuating member accordingly, whilst controlling said actuator so that the latter acts in the same sense, which, simultaneously, causes the clutch to pass into disengaged position. Consequently, said tab is deflected and said elastic means are deformed. Under the principal action of the aerodynamic forces acting on said tab and under the auxiliary action of said elastic means and said actuator, said aerodynamic surface then takes the controlled deflected position. When the latter is reached, the pilot acts on the control of said actuator for the latter to maintain the position that it has just attained and becomes inactive, which, simultaneously, causes the clutch to pass into engaged position. The aerodynamic surface is then in position of aerodynamic trim and the pilot may relax his effort on the actuating member, since this position of trim is maintained by said actuator and by said clutch.

It will be noted that the invention allows aerodynamic trim of said surface with which said tab is associated, although an elastic connection, which is a source of vibrations, is used between the surface and the tab. In fact, according to the invention, said vibrations such as those mentioned hereinabove no longer appear since, when the pilot wishes to maintain a position of deflection of the surface in order to relax his effort on the voluntary actuating member, said clutch is in the engaged position, which has for its consequence to join the mechanical linkage connected to the elastic connection, with the structure of the aircraft. In this way, an efficient and rigid trim is obtained without parasitic vibrations due to the elastic connection.

Between said mechanical linkage and said clutch there is preferably provided a threshold device allowing, when said clutch is in engaged position, a relative displacement of the linkage if the pilot exerts on said voluntary control member an effort greater than a determined threshold.

Thus, if necessary, even in deflected trimmed position of the aerodynamic surface, the pilot may modify the deflection of the aerodynamic surface by exerting on said voluntary control member an effort greater than that corresponding to said threshold, although the clutch is in engaged position.

Consequently, the pilot has the possibility of modifying the deflection of the aerodynamic surface either by acting on the device for simultaneously controlling the actuation of the actuator and the release of the clutch, or by acting directly on the mechanical linkage via the voluntary actuating member by exerting thereon an effort greater than said determined threshold.

In a preferred embodiment, said threshold device comprises an elastic means, such as a spring for example, furnishing the threshold of effort, and the ends of this elastic means are respectively connected to the ends of the legs of a scissor element adapted to pivot about a shaft fast with the structure of the aircraft, the free ends of said legs opposite the preceding ones respectively cooperating with said mechanical linkage and with said clutch.

According to another feature of the invention, means are provided for automatically aligning the clutch with the last position occupied by said mechanical linkage corresponding to the last position occupied by said aerodynamic surface. These automatic alignment means advantageously employ said elastic means which generates the threshold of effort, as well as the free ends of the legs of said scissor element opposite those connected to said elastic means, which, to that end, cooperate respectively with said mechanical linkage and with said clutch.

In this way, the pilot is assured that said clutch, as soon as it is in disengaged position and before passing into its engaged position locking the mechanical linkage, is aligned with the last position occupied thereby, thanks to the action of the elastic means connected to said legs cooperating with said alignment means. Moreover, this results in the value of said threshold of effort that the pilot must overcome when making a voluntary control intended to modify the deflection of the aerodynamic surface, always being identical, whatever the position occupied initially by said linkage.

In a preferred embodiment, said alignment means comprise two pins of which one is fast with a lever mounted to rotate about said pivot of the scissor element, said lever being articulated on said mechanical linkage, and of which the other pin is fast with said clutch, the free ends of said legs of the scissor element being disposed on either side of said pins, pressed theretowards by said threshold generating elastic means and each capable of being applied on the two pins.

In this way, when the lever, further to the displacement of the mechanical linkage caused by an effort exerted by the pilot on said control member, pivots about said shaft fast with the structure of the aircraft, it drives in rotation, via the pin fixed thereto, the free end of the corresponding leg of the scissor element. Therefore, as soon as the pilot wishes to trim the aerodynamic surface in the new deflected position and, to this end, acts on the control of the actuator and therefore disengages the clutch, the action of the spring connecting the two legs of the scissor element returns that leg of the scissor element connected to said clutch towards said position of trim, until the two pins are again aligned. Via the control device, the pilot then locks the clutch in the engaged position corresponding to the last position occupied by the aerodynamic surface connected to the mechanical linkage.

Said device for controlling the actuator and clutch may advantageously be constituted by a control lever capable of being actuated by the pilot, said lever being adapted to occupy on the one hand a rest position for which said clutch is in engaged position and said actuator inactive and, on the other hand, two work positions for which said clutch is in disengaged position and said actuator active, each of said work positions corresponding to a direction of deflection of said aerodynamic surface.

For each work position, said lever may preferably be tipped on one of two electric contactors disposed in parallel and supplied by a single electrical supply.

In an advantageous embodiment, said system comprises a unit combining said clutch, said elastic effort threshold means, and said means for automatically aligning the position of the clutch with the last position occupied by said mechanical linkage corresponding to the last position of the mobile surface.

The invention will be more readily understood on reading the following description with reference to the accompanying drawings, in which:

FIG. 1 illustrates in perspective an aircraft equipped with a rudder provided with a tab.

FIG. 2 schematically illustrates an embodiment of the system according to the invention.

Figure 1:
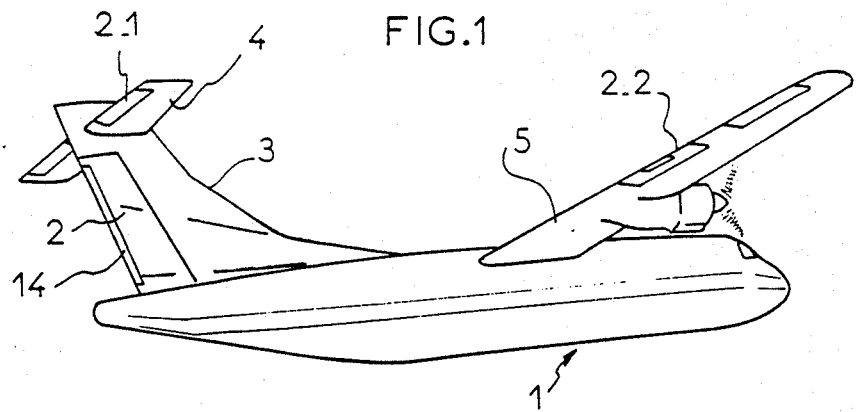

Referring now to the drawings, the system according to the invention is intended for controlling an aerodynamic surface mounted mobile on an aircraft such as the one shown in FIG. 1 and designated by reference 1. The system of the invention is of the type associating the "spring tab" and "trim tab" functions on the same aerodynamic surface, functions defined hereinabove, said system being applied in particular to aircraft without assisted control.

In FIG. 1, the mobile aerodynamic surface 2 is, for example, the rudder articulated on the rear of the vertical stabilizer 3 of the aircraft 1.

Said system may, of course, also be applied to other mobile aerodynamic surfaces, such as the elevators 2-1 articulated on the horizontal stabilizer 4 and the ailerons or flaps 2—2 articulated on the wings 5 of the aircraft 1.

Figure 2:
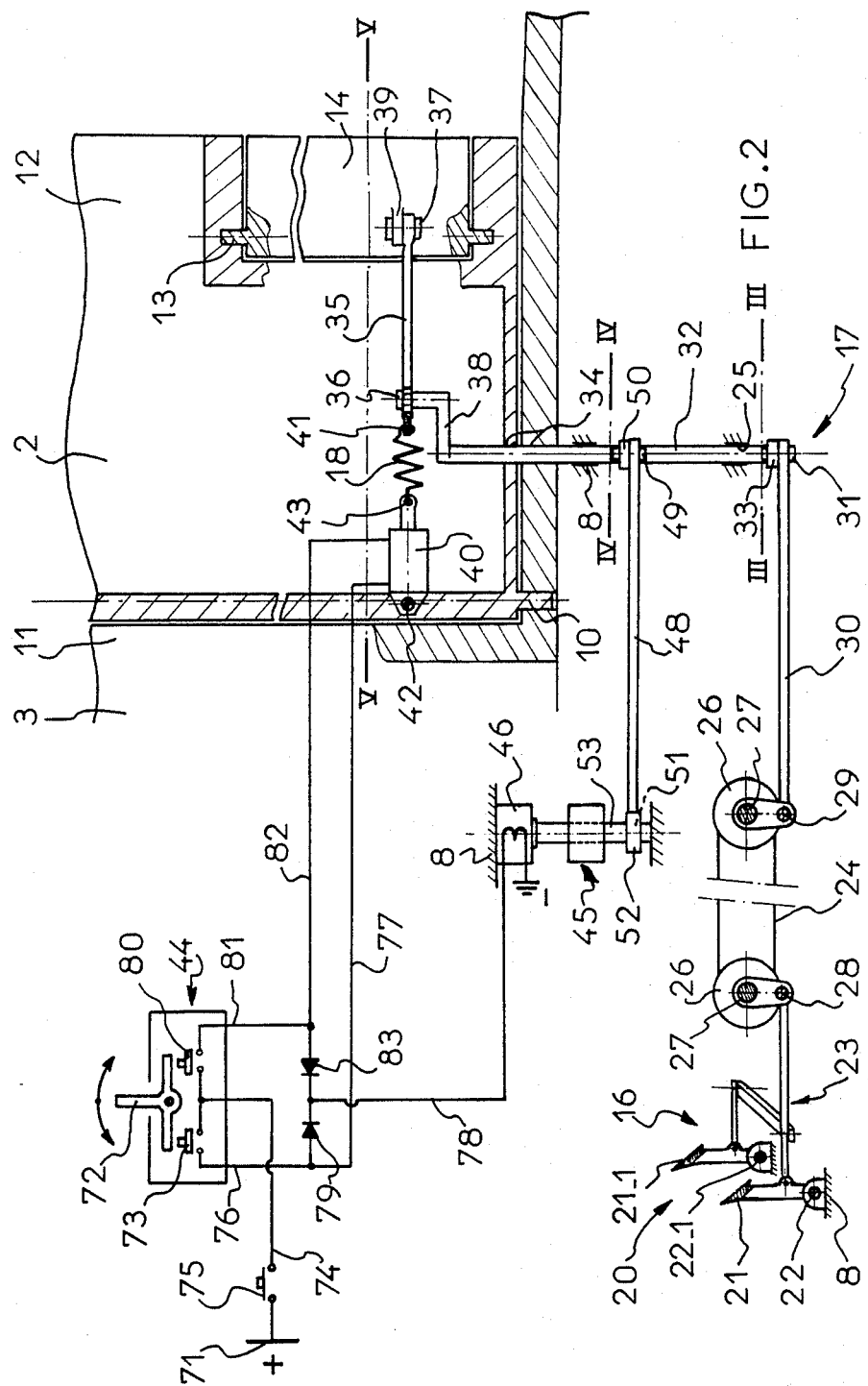

As may be seen in FIG. 2, the aerodynamic surface or rudder 2 is mounted mobile, about an axis of deflection 10, on the rear part 11 of the stabilizer 3. Similarly, on the trailing edge 12 side of the rudder 2 there is articulated, about an axis 13, a tab 14 intended for reducing the manoeuvring efforts that the pilot must exert on the rudder 2 to deflect it. This tab 14 is, in the system according to the invention, directly actuated by the pilot of the aircraft by means of a voluntary actuation member 16 and a mechanical linkage 17. In this configuration, an elastic connecting means, such as a spring 18, is disposed between the tab 14 and the rudder 2. Deflection of the rudder 2 about axis 10 is obtained by controlling the tab 14 by means of the actuation member 16 and the linkage 17, and via the spring 18.

More precisely, the actuation member 16 is, in the example shown, a rudder bar 20 comprising two pedals 21 and 21-1 connected to the structure 8 of the aircraft by articulations 22 and 22-1 respectively. Each pedal, when it is actuated by the pilot, acts on the linkage 17 in one of the two directions of displacement thereof, thanks to a set of connecting rods 23 articulated with respect to one another.

The linkage 17 incorporates a cable transmission 24 comprising two angular quadrants 26, remote from each other, and each mounted about a shaft 27 connected to the structure 8 of the aircraft. The first quadrant 26 is connected to the set of connecting rods 23 by means of a pin 28 and the second quadrant 26 is connected to one end of a rod 30 by means of a pin 29.

Figure 3:
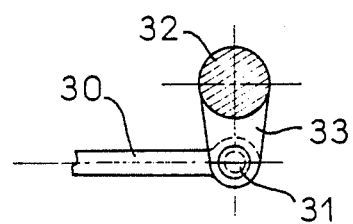
FIGS. 3, 4 and 5 illustrate, in enlarged plan views, details of the system corresponding respectively to lines of section III—III, IV—IV and V—V.
Figure 5:
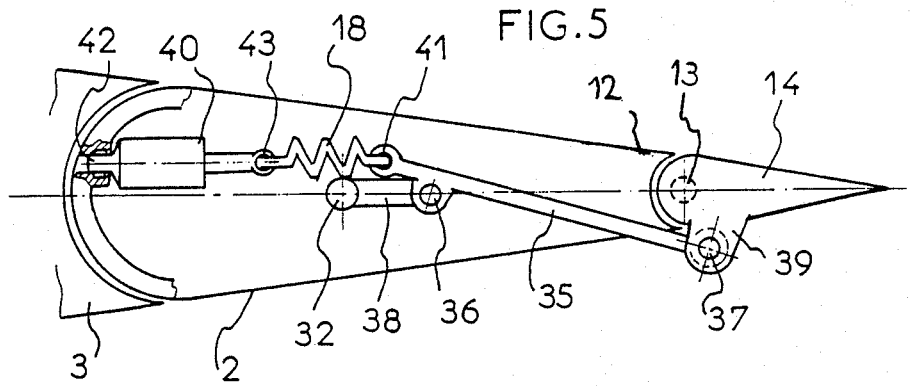

The opposite end of the rod 30 (FIGS. 2 and 3) is articulated at 31 on a rod 32 via an eccentric lug 33. The rod 32 is disposed substantially perpendicularly to rod 30, and penetrates by its opposite end in the rudder 2 thanks to passages 34 made in the structure 8 of the aircraft and in the base of the rudder 2. This rod 32 may rotate about its axis thanks to bearings 25 made in the structure 8, and is articulated at 36 on a connecting rod 35 via a crank handle 38; the connecting rod 35 is connected at its ends, on the one hand to an eccentric lug 39 on the tab 14 by an articulation 37 and, on the other hand, to a first end of the spring 18 by a connection 41 (FIGS. 2 and 5).

The system according to the invention comprises an actuator, for example an electric jack 40, interposed between spring 18 and rudder 2. The jack 40 is articulated at 42 on the rudder 2 and connected at 43 to the second end of the spring 18. The jack 40 may be actuated by a control device 44 connected to an electric supply, so as to act on the spring 18, as will be explained hereinafter. Moreover, the system comprises a unit 45 for blocking and unblocking the position occupied by the rudder 2, the unit being fast with the structure 8 of the aircraft and connected to the linkage 17. This unit 45, shown in FIG. 3 and symbolized in FIG. 2, comprises a clutch 46, a means for providing a threshold of effort of said clutch and means for automatically aligning the position of the clutch with the last position of deflection of the rudder 2, as will be explained hereinbelow. Control of the clutch 46 is also effected by the control device 44, so that the clutch is in disengaged position when the jack 40 is active and in engaged position when jack 40 is inactive.

Figure 4:
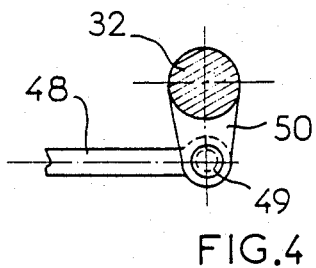

Structurally, the connection between the linkage 17 and the unit 45 is effected by means of a connecting rod 48 articulated at its ends on the one hand, at 49, on rod 32 via an eccentric lug 50 (FIG. 4) parallel to lug 33 and, on the other hand, at 51 on a lever 52 mounted to rotate about a shaft 53 fast with the structure 8 of the aircraft via two fixing lugs 54, disposed at the respective ends of the shaft 53. The latter bears the clutch 46 so that the fixed part 55 of the clutch is fast with the shaft 53 and therefore with the structure 8 of the aircraft and the mobile part 56 of the clutch can move with respect to this shaft 53.

When the connecting rod 30 is actuated by means of the rudder bar 20, via the cable transmission 24, the latter provokes rotation of rod 32 in the bearings 25 about its vertical axis, which, in turn, simultaneously causes displacement of the rod 48, which thus acts as reproduction rod.

According to the invention, the effort threshold means allows, when said clutch is in engaged position, a relative displacement of the linkage 17 and consequently of the rudder 2, via the tab 14 and the spring 18, if the pilot exerts on the control member 16 an effort greater than a determined threshold.

In this way, the pilot has the possibility of modifying the deflection of the rudder 2, either by acting on the control device provoking actuation of the actuator 40 and release of the clutch 46, or by acting directly on the linkage 17 via the actuation member 16 by exerting thereon an effort greater than that exerted by the effort threshold means, although the clutch is in engaged position. The effort exerted by said threshold on the linkage must be sufficient to avoid the appearance of instability of the aircraft about the axis of roll, but, on the other hand, the effort exerted by the pilot to exceed the value of the threshold must be relatively small for him to be able to manoeuvre without difficulty the linkage and consequently the rudder.

Figure 6:
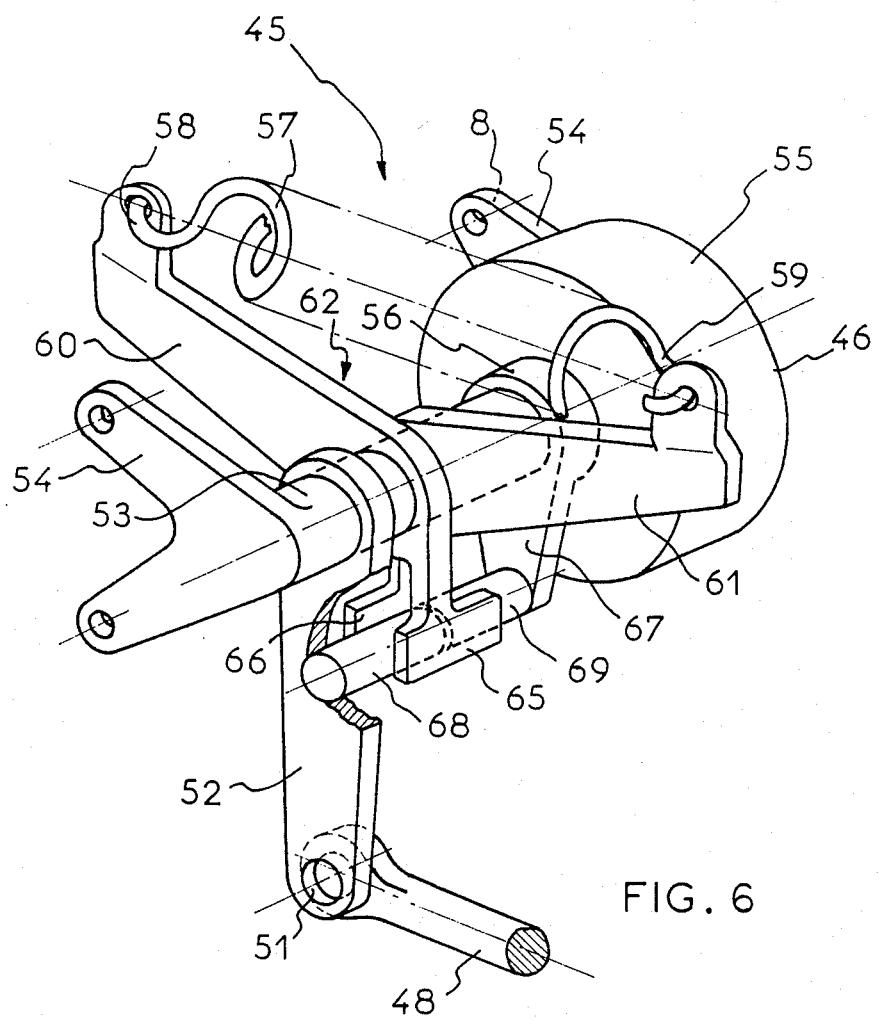
FIG. 6 shows in partially cut perspective, a preferred embodiment of the combined clutch, effort threshold and alignment unit of said system.

In FIG. 6, a spring 57 makes it possible to furnish such a threshold of effort. The ends 58 and 59 of said spring 57 are each connected to one end of one of the legs 60 and 61 of a scissor element 62. Said legs 60 and 61 are mounted to rotate about the shaft 53 and their flared free ends 65 and 66, opposite the preceding ones, cooperate with the lever 52 connected to the connecting rod 48 and with a lug 67 connected to the mobile part 56 of the clutch 46.

The free ends 65 and 66 of the legs 60 and 61 are disposed on either side of pins 68 and 69. Pin 68 is fast with the lever 52 mounted to rotate about the shaft 53 and pin 69 is fast with the lug 67 connected to the clutch 46. The free ends 65 and 66 of the legs of the scissor element 62 are pressed against the pins 68 and 69 thanks to the elastic means generating the threshold of effort constituted by the spring 57. In this way, the means for automatically aligning the position of the clutch 46 with the last position occupied by the linkage 17 corresponding to the last position occupied by the rudder, comprising the two pins parallel to the shaft 53, employs the spring 57, as well as the free ends 65 and 66 of the legs 60 and 61 of the scissor element opposite those connected to spring 57. These free ends 65 and 66 cooperate, by pin 68, with said linkage 17 connected to the rudder 2 and by pin 69 with the lug 67 connected to the mobile part 56 of the clutch 46. Thanks to this arrangement, the pilot is assured that the mobile part 56, as soon as it is in disengaged position with respect to the fixed part 57 and before passing into the engaged position locking the linkage 17 (positions obtained thanks to the action of the pilot on the control device 44), is aligned with the last position occupied by the linkage further to the return action of the spring 57 connected to the legs of the scissor element cooperating with the pins 68 and 69.

The control device 44 of the jack 40 and of the clutch 46 (FIG. 2) comprises a control lever 72 located in the pilot's cabin of the aircraft, adapted to occupy on the one hand a rest position for which the clutch 46 is in engaged position and the electric jack 40 inactive and, on the other hand, two work positions for which the clutch 46 is in disengaged position and the jack active.

Each of the work positions corresponds to a direction of deflection of the rudder 2 given by the retraction or extension of the rod of the jack 40. To that end, the control lever 72 may be placed in contact with a first contactor 73 connected to a general supply 71 by a connection 74 comprising a general control switch 75. The output 76 of the first contactor 73 is connected on the one hand to the electric jack 40 by means of a connection 77 and, on the other hand, to the electrically controlled clutch 46, by means of a connection 78 through a diode 79, arranged between the output 73 and the connection 78.

The control lever 72 may also be placed in contact with a second contactor 80, disposed in parallel with the first 73, and connected to the general supply 71 by the same connection 74. The output 81 of the second contactor 80 is connected, on the one hand, to the electric jack 40 by means of a connection 82 and, on the other hand, to the clutch 46 by means of the same connection 78, but through a diode 83 arranged between the output 81 and the connection 78.

The connection 78 for controlling the clutch 46 is common whatever the work position occupied by the contactors. The two diodes 79 and 83, mounted in opposition, prevent the simultaneous supply of the jack 40 by connections 77 and 82 respectively, each allowing displacement in one direction of the rod of the jack 40.

The system is employed when the pilot wishes to modify the path of the aircraft.

The rudder 2, the tab 14 and the assembly of the mechanical linkage 17 are previously blocked in their last position of deflection by unit 45, the position of deflection being able to be that corresponding to the alignment of the rudder in the plane of the stabilizer. This latter position of deflection is maintained by the clutch 46 in engaged position, the mobile part 56 thereof being fast with the fixed part 55. The control device 44 is obviously in its rest position. The position of pin 69, connected to the lug 67 of the mobile part, is aligned with that of the pin 68 of the lever 52 articulated on the connecting rod 48 of the linkage, of which the position corresponds to that of the rudder 2.

Alignment of these two pins is obtained by employing the spring 57 providing threshold of effort connected to the legs 60 and 61 of the scissor element 62 of which the free ends 65 and 66 press the two pins 68 and 69 so as to return the pin 69 connected to the clutch 46 in line with the pin 68 connected to the linkage 17.

In the event of the pilot wishing to modify the position of deflection of the rudder and then to keep this new position in order to maintain the aircraft on a path whilst relaxing his effort on the voluntary control member 20, he acts on the control device 44 in order simultaneously to control the jack 40 and the disconnection of the clutch 46. The pilot previously switched on the device 44 by the switch 75, and acted on the lever 72 abutting for example on the contactor 73, this having for its consequence on the one hand to provoke extension of the rod of jack 40 supplied by connection 77 and, on the other hand, to disengage the mobile part 56 from the fixed part 55 of the clutch 46 supplied by the connection 78.

The action of the pilot on the rudder bar 20 provokes displacement of the connecting rod 30 via the set of rods 23 and the cable transmission 24, then the rotation of rod 32 in the bearings 25, also provoking the displacement of the rod 48 and therefore of the lever 52. The crank handle 38, fast with the rod 32, is driven in rotation and ensures by its articulation 36 the displacement of the rod 35 connected to the tab 14, through the spring 18 connected to said rod 35. The tab 14 pivots about its axis 13 and, under the action of the aerodynamic forces acting on said tab 14 and under the action of the spring 18 and of the jack 40 connected to spring 18, the rudder 2 then takes the new position of deflection desired by the pilot. The action of the jack 40 thus tends to reduce, and even cancel, the effort that the pilot exerts on the rudder bar 20 corresponding to the effort exerted on the spring 18.

When the new position of deflection of the rudder is reached, the pilot acts on the control device 44 returning the lever 72 into rest position and relaxes his effort on the rudder bar 20. From that moment, the jack 40, no longer being supplied, blocks and maintains its new position and the clutch passes into the engaged position, being aligned with the new position occupied by the linkage 17 corresponding to the new position of deflection of the rudder. In fact, before the clutch passes into the engaged position, the rod 48 connected to rod 32 is displaced, provoking rotation of the lever 52 on which it is articulated. The pin 68, fixed to this lever 52, then takes along the flared free end 66 of the leg 61 of the scissor element 62, and, under the action of spring 57, connecting the two legs 60 and 61, the latter returns the other leg 60 of the scissor element, thus provoking, thanks to the flared free end 65 of this leg, the return of pin 69, connected to the lug 67 of the mobile part 56 of the clutch 46, in line with pin 68.

The rudder 2 is then in position of aerodynamic trim and the aircraft continues the new path defined by the pilot.

As mentioned hereinbefore, the pilot may also act on the position of deflection of the rudder without using the control device 44, thanks to the effort threshold spring 57 which allows, if the pilot exerts an effort on the rudder bar greater than that delivered by said spring 57, the modification of the position of deflection of the rudder 2. Thanks to the pins 68 and 69 which make it possible to realign the position of the mobile part of the clutch with the position occupied by the linkage, via the legs 60 and 61 of the scissor element 62 and of spring 57, the value of the threshold of effort given by this spring, that the pilot must overcome when he desires to modify the deflection of the rudder without passing through the control device disengaging the clutch, is always identical.

Where the pilot wishes momentarily to correct the position of the rudder by acting directly on the linkage without using the control device 44, he exerts on one of the pedals of the rudder bar 20 an effort greater than that delivered by the spring 57. This makes it possible, via the assembly of the mechanical linkage 17, for the spring 18 to be compressed or relaxed, provoking a deflection of the tab 14 about axis 13 thanks to the connecting rod 35, and consequently a deflection in opposite direction of the rudder 10 about pivot axis 10. The jack 40 in that case performs the role of a rigid articulated connecting rod.

If the pilot decides that the temporary new position of deflection has made it possible to correct the path of the aircraft sufficiently, he then relaxes his effort on the rudder bar, this returning the pin 68 connected to the linkage into a position aligned with pin 69 connected to the clutch via the legs of the scissor element 61 and spring 57 which returns into its initial position.

On the other hand, if the pilot wishes to maintain this new position of deflection of the rudder in order to relax his effort on the rudder bar, he acts on the lever 72 of the control device 44, this having for its effect to control the movement of extension or of retraction of the jack 40, and to release the clutch 46.

Once the position of trim of the rudder with the tab is obtained, the pilot tips lever 72 into rest position, this locking the jack 40 and connecting the linkage 17 with the clutch 46, of which the mobile part 56 has realigned with the new position of the linkage corresponding to the present position of deflection of the rudder.

From the foregoing, it is obvious that the invention attains the object of being able to associate on the same aerodynamic surface the so-called "spring tab" and "trim" functions with, moreover, means providing threshold of effort and alignment.

What is claimed is:

1. A system for controlling an aerodynamic surface mounted mobile on an aircraft so as to be able to pivot freely about a fixed axis and provided with a tab itself articulated on the trailing edge of said aerodynamic surface, said system being such that elastic connecting means are provided between said tab and said aerodynamic surface and said tab can be directly actuated by the pilot, via a voluntary actuating member and a mechanical linkage, wherein this system comprises:

an actuator interposed between said elastic connecting means and said aerodynamic surface;

a device for controlling said actuator; and a clutch connecting the structure of the aircraft to said mechanical linkage;

and wherein said device for controlling the actuator also controls said clutch, so that the latter is in disengaged position when said actuator is active and in engaged position when said actuator is inactive.

2. The system of claim 1, wherein, between said mechanical linkage and said clutch there is provided a threshold device allowing, when said clutch is in engaged position, a relative displacement of the linkage if the pilot exerts on a voluntary control member an effort greater than a determined threshold.

3. The system of claim 2, wherein said threshold device comprises an elastic means furnishing the threshold of effort, the ends of this elastic means being respectively connected to the ends of the legs of a scissor element adapted to pivot about a shaft fast with the structure of the aircraft, the free ends of said legs opposite the preceding ones respectively cooperating with said mechanical linkage and with said clutch.

4. The system of claim 3, wherein said system comprises means for automatically aligning the clutch with the last position occupied by said mechanical linkage corresponding to the last position occupied by said aerodynamic surface.

5. The system of claim 4, wherein said automatic alignment means employ said elastic means which generates the threshold of effort, as well as the free ends of the legs of said scissor element opposite those connected to said elastic means, said free ends to that end cooperating respectively with said mechanical linkage and with said clutch.

6. The system of claim 4, wherein said automatic alignment means comprise two pins of which one is fast with a lever mounted to rotate about said pivot of the scissor element, said lever being articulated on said mechanical linkage, and of which the other pin is fast with said clutch, the free ends of said legs of the scissor element being disposed on either side of said pins, pressed theretowards by said threshold generating elastic means and each capable of being applied on the two pins.

7. The system of claim 6, wherein the two pins are parallel to said shaft.

8. The system of claim 1, wherein said device for controlling the actuator and clutch is constituted by a control lever capable of being actuated by the pilot, said lever being adapted to occupy on the one hand a rest position for which said clutch is in engaged position and said actuator inactive and, on the other hand, two work positions for which said clutch is in disengaged position and said actuator active, each of said work positions corresponding to a direction of deflection of said aerodynamic surface.

9. The system of claim 8, wherein, for each work position, said lever is tipped on one of two electric contactors disposed in parallel and supplied by a single electrical supply.

10. The system of claim 4, wherein said system comprises a unit combining said clutch, said elastic effort threshold means, and said means for automatically aligning the position of the clutch with the last position occupied by said mechanical linkage corresponding to the last position of the mobile surface.

* * * * *